(12) United States Patent
Okada

(10) Patent No.: US 9,118,766 B2
(45) Date of Patent: Aug. 25, 2015

(54) COMMUNICATION METHOD, COMMUNICATION SYSTEM, AND COMMUNICATION TERMINAL

(75) Inventor: Kousuke Okada, Kanagawa (JP)

(73) Assignee: KYOCERA Corporation, Kyoto (JP)

( * ) Notice: Subject to any disclaimer, the term of this patent is extended or adjusted under 35 U.S.C. 154(b) by 1752 days.

(21) Appl. No.: 11/997,146

(22) PCT Filed: Jul. 28, 2006

(86) PCT No.: PCT/JP2006/315027
§ 371 (c)(1),
(2), (4) Date: Mar. 9, 2010

(87) PCT Pub. No.: WO2007/013614
PCT Pub. Date: Feb. 1, 2007

(65) Prior Publication Data
US 2010/0167767 A1    Jul. 1, 2010

(30) Foreign Application Priority Data
Jul. 28, 2005 (JP) .................................. 2005-219702

(51) Int. Cl.
*H04B 7/00* (2006.01)
*H04M 3/56* (2006.01)
(Continued)

(52) U.S. Cl.
CPC ............... *H04M 3/56* (2013.01); *H04L 65/403* (2013.01); *H04L 67/24* (2013.01); *H04L 67/303* (2013.01);
(Continued)

(58) Field of Classification Search
CPC ....... H04W 76/005; H04W 4/10; H04W 4/08; H04L 12/1822; H04L 65/4061
USPC .......................... 455/90.2, 518, 519, 500, 566
See application file for complete search history.

(56) References Cited

U.S. PATENT DOCUMENTS 5,987,332 A * 11/1999 Gettleman et al. ............ 455/518
7,050,829 B2    5/2006 Motohashi
(Continued)

FOREIGN PATENT DOCUMENTS

CN    1377188 A    10/2002
EP    1071295 A2    1/2001
(Continued)

OTHER PUBLICATIONS

3GPP, "3rd Generation Partnership Project; Technical Specification Group Services and System Aspect; 3GPP enablers for Open Mobile Alliance (OMA), Push-to-talk over Cellular (PoC) services; Stage 2 (Release 6)" 3GPP Standard; 3GPP TR 23.979, No. V6.2.0, pp. 1-38, Jun. 1, 2005.
(Continued)

*Primary Examiner* — Ayodeji Ayotunde
(74) *Attorney, Agent, or Firm* — Studebaker & Brackett PC

(57) ABSTRACT

The invention relates to a one to multi communication method wherein each terminal participating in group communication can grasp the states of the other terminals, a communication system, and a communication terminal used for the same. Each terminal acquires information concerning its own state (for example the reception sensitivity of a signal from a base station) and transmits it via a communication management apparatus to the other communication terminals. Further, information concerning the states of the other communication terminals is displayed on a display part provided in each communication terminal. Due to this, each communication terminal can grasp correctly of the information concerning the states of the other communication terminals, therefore it becomes possible to judge whether or not the other communication terminals are in states where normal conversation is possible, and occurrence of a difference in recognition among users in the one to multi communication can be prevented.

15 Claims, 11 Drawing Sheets

(51) Int. Cl.
  *H04W 4/10* (2009.01)
  *H04W 76/00* (2009.01)
  *H04L 29/06* (2006.01)
  *H04L 29/08* (2006.01)
  *H04M 3/42* (2006.01)

(52) U.S. Cl.
  CPC ............... *H04L 67/36* (2013.01); *H04W 4/10* (2013.01); *H04W 76/005* (2013.01); *H04M 3/42093* (2013.01); *H04M 3/42365* (2013.01); *H04M 2203/654* (2013.01); *H04M 2207/18* (2013.01)

(56) References Cited

U.S. PATENT DOCUMENTS

| | | | | |
|---|---|---|---|---|
| 7,283,832 | B2 * | 10/2007 | Jia et al. | 455/517 |
| 7,689,212 | B2 * | 3/2010 | Lim | 455/425 |
| 2002/0132649 | A1 | 9/2002 | Motohashi | |
| 2002/0151321 | A1 * | 10/2002 | Winchell et al. | 455/519 |
| 2003/0119540 | A1 * | 6/2003 | Mathis | 455/518 |
| 2003/0129985 | A1 * | 7/2003 | Naden et al. | 455/447 |
| 2003/0148779 | A1 | 8/2003 | Aravamudan et al. | |
| 2003/0181213 | A1 * | 9/2003 | Sugar et al. | 455/454 |
| 2004/0097224 | A1 * | 5/2004 | Lim | 455/425 |
| 2004/0097237 | A1 * | 5/2004 | Aoyama | 455/445 |
| 2004/0148406 | A1 * | 7/2004 | Shima | 709/228 |
| 2005/0009542 | A1 | 1/2005 | Oprescu-Surcobe et al. | |
| 2005/0054361 | A1 * | 3/2005 | Turcanu et al. | 455/518 |
| 2005/0143135 | A1 * | 6/2005 | Brems et al. | 455/564 |
| 2005/0193211 | A1 * | 9/2005 | Kurose | 713/185 |
| 2007/0214217 | A1 * | 9/2007 | Ueno et al. | 709/204 |
| 2008/0108397 | A1 * | 5/2008 | Piipponen et al. | 455/574 |

FOREIGN PATENT DOCUMENTS

| | | |
|---|---|---|
| JP | 04200032 A | 7/1992 |
| JP | 2002281128 A | 9/2002 |
| JP | 2004166056 A | 6/2004 |
| JP | 2005-018423 | 1/2005 |
| JP | 2005011298 A | 2/2005 |
| JP | 2005057709 A | 3/2005 |
| JP | 2005-136524 | 5/2005 |
| JP | 2005-518166 | 6/2005 |
| JP | 2005147753 A | 6/2005 |
| WO | 03037007 A1 | 5/2003 |
| WO | 03/069927 | 8/2003 |
| WO | 2005011298 A2 | 2/2005 |

OTHER PUBLICATIONS

3GPP, "3rd Generation Partnership Project; Technical Specification Group Service and System Aspect; Presence Service; Architecture and functional description (Release 6)" 3GPP Standard; 3GPP TR 23.441, No. V6.8.0, pp. 1-36, Jun. 1, 2005.

Extended European search report dated Sep. 30, 2011 for corresponding European application 06781937.5 cites the U.S. patent application publications, foreign patent documents and non-patent literature above.

Chinese language office action dated Oct. 25, 2010 and its English language translation for corresponding Chinese application 200680080035792 lists the reference above.

Japanese language office action dated Jan. 25, 2011 and its English language translation for corresponding Japanese application 2007526923 lists the reference above.

International Search Report for corresponding WO application PCT/JP2006/315027 lists the references above.

Japanese language office action dated Jun. 21, 2011 and its English language translation for corresponding Japanese application 2007526923 cites the foreign patent documents above.

\* cited by examiner

FIG. 4

| OWNER | LOG-IN SITUATION | SIGNAL RECEPTION SENSITIVITY | TELEPHONE NUMBER | REGISTERED IMAGE |
|---|---|---|---|---|
| REGISTRANT A | LOGGED IN | 0 | 090-1111-1111 | a.jpg |
| REGISTRANT B | LOGGED IN | 2 | 090-9999-9999 | b.jpg |
| REGISTRANT C | LOGGED OUT | – | 090-1111-9999 | c.jpg |
| REGISTRANT D | LOGGED IN | 3 | 090-1111-2222 | d.jpg |
| REGISTRANT E | LOGGED IN | 1 | 090-1111-8888 | e.jpg |
| REGISTRANT F | LOGGED OUT | – | 090-1234-5678 | f.jpg |
| ⋮ | ⋮ | ⋮ | ⋮ | ⋮ |

COMMUNICATION METHOD, COMMUNICATION SYSTEM, AND COMMUNICATION TERMINAL

This application is a national phase of PCT application No. PCT/JP2006/315027 which application is hereby incorporated by reference in its entirety. This application also claims benefit of priority under 35 U.S.C. §119 to Japanese Patent Application No. 2005-219702, filed Jul. 28, 2005, the entire contents of which are incorporated by reference.

TECHNICAL FIELD

The present invention relates to a one to multi communication method by mobile phones or other communication terminals, a communication system of the same, and a communication terminal for one to multi communication.

BACKGROUND ART

In recent years, the communication type by telephones have become diversified. In addition to conventional speech communication by circuit switch, telephones which are able to perform packet communications utilizing IP (Internet Protocol) networks are being widely utilized. For example, there is "chat mail" where mobile phones swap e-mail in real time conversation (see Patent Document 1). Chat mail is one of the types of communication called "group communications" where members registered in advance form a group and reciprocate text and other data each other in real time.

In group communications, in general, one terminal in the group becomes sender and the other terminals become receivers for one to multi communications. When a plurality of terminals participate in communications, it is convenient if the terminal side can grasp what members are participating in the communications at present. Therefore, in for example the system disclosed in Patent Document 2, a server apparatus managing the group communications provides each terminal with a list of participating members which is displayed on a display part of each terminal.

In such group communications, Speech communication has been attempted by utilizing VoIP (voice over Internet Protocol). One of these is called "PoC (push to talk over cellular)". In PoC, an SIP (session initiation protocol) server manages groups and members in groups and performs call control of packetized audio (see Patent Document 3).

In PoC, a terminal ending group communications, as disclosed in for example Patent Document 3, transmits a request for ending communication to the server apparatus managing the communication. When receiving this ending request, the server apparatus performs a predetermined procedure for ending the group communication of the terminal and notifies the fact that the communication has ended by completion of the procedure to the requesting side terminal.

Patent Document 1: Japanese Patent Publication (A) No. 2005-18423
Patent Document 2: Japanese Patent Publication (A) No. 2005-136524
Patent Document 3: Japanese Patent Publication (A) No. 2005-518166

DISCLOSURE OF THE INVENTION

Problem to be Solved by the Invention

In a case where one terminal ends group communication, for example, as explained above, the terminal transmits an end request to the server apparatus, whereby the server apparatus can grasp the end of communication by the terminal. For this reason, the server apparatus which received the end request notifies this to the other terminals participating in the communication, whereby the other terminals can also correctly grasp that the participant has left.

However, in the case of a mobile phone coupled in wireless communication, it is possible for communication to end up with cut off when the signal from the base station cannot easily reach the mobile phone. If a receiving terminal becomes unable to communicate in the group communication, users of the other terminals will end up proceeding with the conversation while not knowing that fact. Therefore, the users will differ in recognition of the conversation and smooth communication will be hindered.

Namely, in usual group communication, information is transmitted one way from one terminal to a plurality of terminals. Therefore, there is the inconvenience that each terminal cannot grasp in real time what state the other receiving terminals are in.

The present invention was made in consideration with such circumstances and has as an object thereof to provide a one to multi communication method and communication system enabling each terminal participating in the communication to obtain a grasp of the states of the other terminals and a communication terminal used in such a communication system.

Means for Solving the Problem

A first aspect of the present invention relates to a communication method where one among three or more communication terminals coupled in wireless communication transmits data to the other plurality of communication terminals. The communication method according to the above first aspect has a first step wherein each of the above three or more communication terminals acquire first information concerning its own state, a second step wherein each of the above three or more communication terminals transmit the acquired first information to a management apparatus, a third step wherein the management apparatus receive the first information from each communication terminal and, upon this, transmit the received first information to each of above three or more communication terminals or each of other communication terminals except a sender side of the first information, and a fourth step wherein each of the three or more communication terminals display the first information received from the management apparatus in a display part provided at each.

A second aspect of the present invention relates to a communication system provided with three or more communication terminals coupling in wireless communication and a management apparatus, wherein one among the above three or more communication terminals transmits data to the other plurality of communication terminals. In the communication system according to the above second aspect, the management apparatus has a first communication part for communicating with the communication terminals, a first reception control part for controlling the system so that the first communication part receives the first information concerning the state of each communication terminal transmitted from each of the above three or more communication terminals, and a first transmission control part for receiving the first information from the first communication part to each of the above three or more communication terminals or each of the other communication terminals except the sender side of the first information when the first transmission control part receives the first information, and each communication terminal has a second communication part for communicating with the management apparatus, a display part for displaying the information, an information acquisition part for acquiring first information concerning its own state, a second transmission control part for controlling the second communication part so as to transmit the acquired first information to the management apparatus, a second reception control part for controlling the second communication part so as to receive the first information transmitted from the management apparatus, and a display control part for displaying the received first information on the display part.

A third aspect of the present invention relates to a communication terminal used in a communication system wherein one among three or more communication terminals coupled in wireless communication transmits data to the other plurality of communication terminals. The communication terminal according to the above third aspect has a communication part for communicating with the communication system, a display part for displaying the information, an information acquisition part for acquiring first information concerning its own state, a transmission control part for controlling the communication part so as to transmit the acquired first information, a reception control part for controlling the communication part so as to receive the first information acquired at the other communication terminal in the communication system, and a display control part for displaying the received first information in the display part.

The transmission control part may control the communication part so as to transmit changed first information when the first information acquired at the information acquisition part changes.

The reception control part may receive a transmission request of the first information at the communication part. In this case, the transmission control part may control the communication part to transmit the first information when the transmission request is received.

The reception control part may receive first information including information of a communication terminal not responding to the transmission request at the communication part. In this case, the display control part may display the information of the communication terminal not responding to the transmission request in the display part based on the received first information.

The display control part may generate a list of all communication terminals in the communication system with entries of the communication terminals given marks representing the signal reception states, or with entries of communication terminals represented by marks enabling identification of the signal reception states, based on the first information and display the same in the display part.

For example, the display control part may change at least one of the color, size, and shape of the marks in accordance with the signal reception state of each communication terminal.

Effect of the Invention

According to the present invention, each terminal participating in communications can obtain a grasp of the states (for example, radio signal reception states) of the other terminals, therefore a difference in recognition among users can be prevented and smooth communications can be realized.

BRIEF DESCRIPTION OF THE DRAWINGS

FIG. 4 is a diagram showing an example of information registered in a database of the communication management apparatus.

DESCRIPTION OF NOTATIONS

1 . . . antenna, 2, 8 . . . communication parts, 3 . . . key input part, 4 . . . audio processing part, 5 . . . display part, 6, 11 . . . storage parts, 111 . . . database, 7, 10 . . . control parts, 71, 103 . . . transmission control parts, 72, 102 . . . reception control parts, 73 . . . display control part, 74 . . . signal reception sensitivity acquisition part, 101 . . . database control part, 9 . . . user interface part, 100-1 to 100-4 . . . communication terminals, 200 . . . communication management apparatus, 300 . . . communication network, and 300-1 to 300-3 . . . base stations.

BEST MODE FOR CARRYING OUT THE INVENTION

Below, an explanation will be given of preferred embodiments of the present invention with reference to the drawings.

Figure 1:
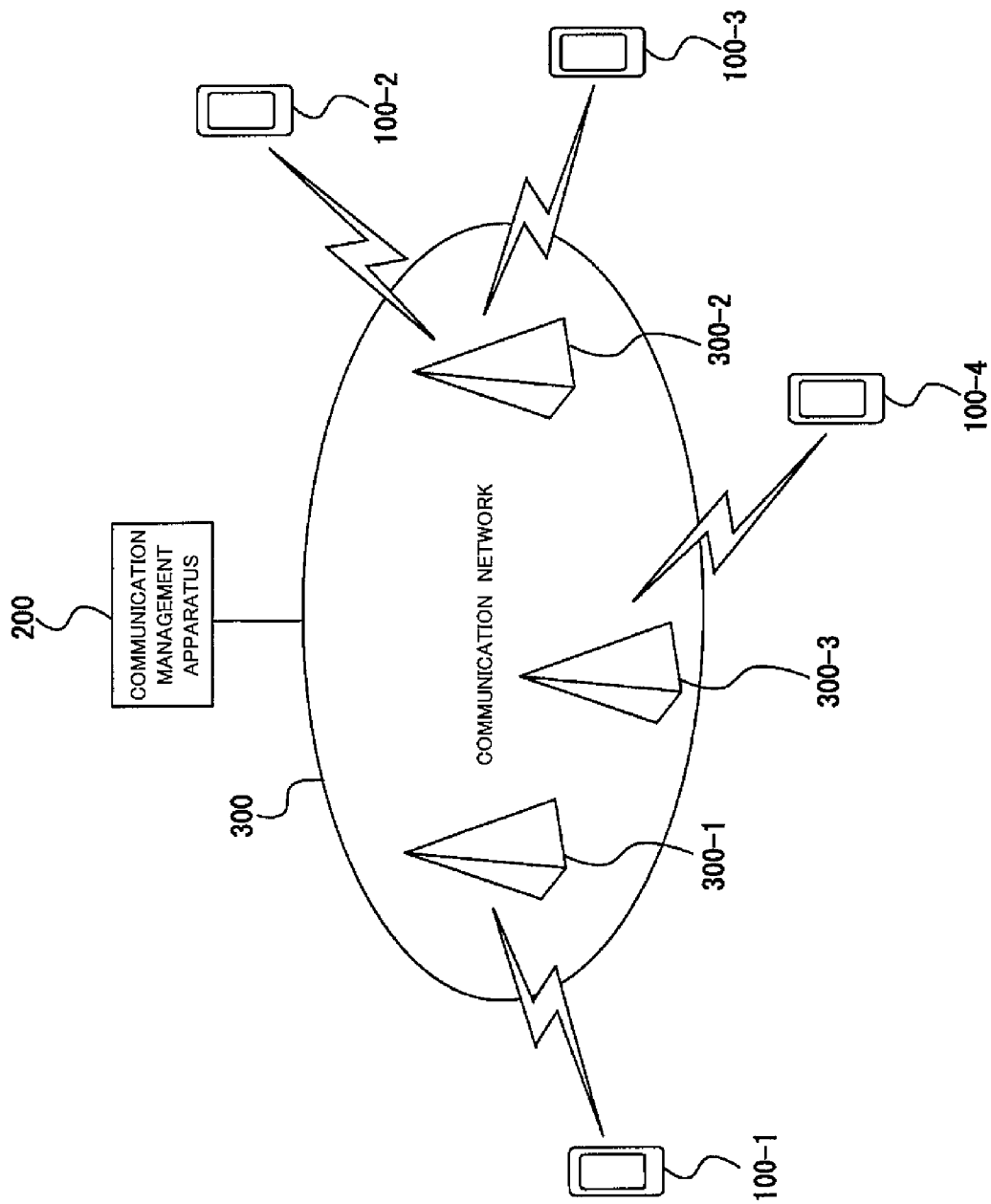
FIG. 1 is a diagram showing an example of the configuration of a communication system according to an embodiment of the present invention.

FIG. 1 is a diagram showing an example of the configuration of a communication system according to an embodiment of the present invention.

The communication system according to the present embodiment, for example, as shown in FIG. 1, has three or more communication terminals (100-1, 100-2, 100-3, . . . ) and a communication management apparatus 200.

Each communication terminal 100-$i$ ("i" indicates a positive natural number) is for example a mobile phone or other wireless communication terminal and is connected to a communication network 300 via a base station (300-1, 300-2, 300-3, . . . ). Further, each communication terminal 100-$i$ performs data communications under the control of the communication management apparatus 200 connected to the communication network 300. In the present embodiment, as an example, it is assumed that group communication according to PoC (push to talk over cellular) is carried out.

The transmitted data in this data communication includes for example audio of a conversation, images, text, and other data.

In the present communication system, the one communication terminal permitted to transmit audio by the communication management apparatus 200 among the three or more communication terminals (100-1, 100-2, 100-3, . . . ) can transmit the audio data to the other plurality of communication terminals. The communication terminal desiring to transmit for example transmits a request command to permit the transmission to the communication management apparatus 200.

Each communication terminal 100-$i$ acquires information (first information) concerning the reception state of a radio signal transmitted from the base station. For example, it measures the reception sensitivity of the radio signal transmitted from the base station at each constant time and acquires a measurement result thereof as the information of the radio signal reception state. Each communication terminal 100-$i$ transmits the acquired information of the signal reception state to the communication management apparatus 200.

For example, each communication terminal 100-$i$, based on the acquired information of the radio signal reception state, judges whether or not the signal reception state has changed and, when judging it has changed, transmits the information of the radio signal reception state acquired after the change to the communication management apparatus 200.

For example, each communication terminal 100-$i$ compares the information acquired the previous time and the information acquired the current time, and judges that the signal reception state has changed when the two are different. Alternatively, it may compare a level of the signal reception state represented by the acquired information with a predetermined threshold value and, when this level has degraded more than a threshold value or been enhanced more than a threshold value, judge that the signal reception state has changed.

Further, each communication terminal 100-$i$ may transmit the information of the signal reception state to the communication management apparatus 200 in response to the information transmission request of the communication management apparatus 200. Namely, when receiving a predetermined information transmission request from the communication management apparatus 200, it may transmit the acquired information of the radio signal reception state to the communication management apparatus 200.

Further, each communication terminal 100-$i$ has a display part which is able to display various types of information provided by the communication management apparatus 200. For example, it displays a table of terminals participating in communication at present, information of signal reception states acquired at the terminals, and other information in the display part.

The communication management apparatus 200 is an apparatus for managing group communication of PoC by three or more communication terminals (100-1, 100-2, 100-3, . . . ).

When receiving a start request of group communication by PoC from one communication terminal, the communication management apparatus 200 calls up the communication terminals of the other parties in response to that request and establishes a communication session.

After the establishment of the communication session, the communication management apparatus 200 receives the information of the signal reception states explained above transmitted from the communication terminals. The communication management apparatus 200 maintains a database managing information of communication terminals participating in group communication. When receiving information of the signal reception states sent from the communication terminals, the management apparatus registers this as one of the information representing the states of terminals in the database.

The communication management apparatus 200 may register the information of signal reception states automonously transmitted from the communication terminals as previously explained in the database or may register the information of radio signal reception states sent as results of a request for transmission of information to the communication terminals in the database. In the latter case, the communication management apparatus 200 for example requests transmission of information from the communication terminals at each constant period.

When the information of the signal reception states registered in the database is updated, the communication management apparatus 200 transmits that updated information to communication terminals. At this time, the communication management apparatus 200 may transmit the information all together to all communication terminals or may transmit the information to only part of the communication terminals other than the updated information provider side communication terminal.

Figure 2:
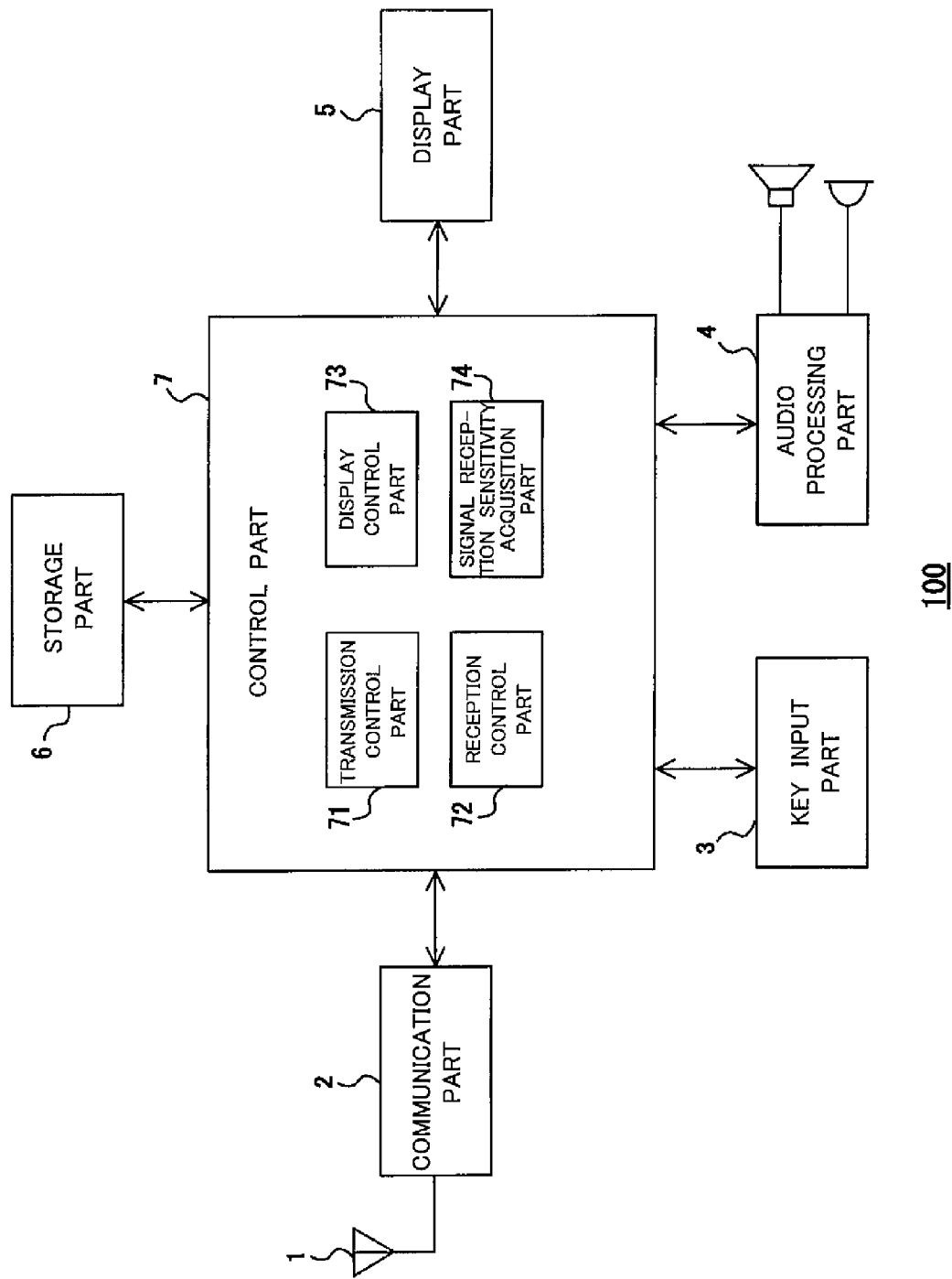
FIG. 2 is a diagram showing an example of the configuration of a communication terminal according to an embodiment of the present invention.

FIG. 2 is a diagram showing an example of the configuration of a communication terminal (100-1, 100-2, 100-3, . . . ) according to an embodiment of the present invention.

The communication terminal, for example, as shown in FIG. 2, has an antenna 1, a communication part 2, a key input part 3, an audio processing part 4, a display part 5, a storage part 6, and a control part 7.

The communication part 2 performs processing concerning wireless communication with a base station (300-1, 300-2) of the communication network 300. For example, it applies predetermined modulation to the transmission data supplied from the control part 7 to convert this to a wireless signal and transmits the same from the antenna 1. Further, the wireless signal from the base station received at the antenna 1 is demodulated to convert to reception data and outputs the same to the control part 7.

The communication terminal performs communication via this communication part 2 with the communication management apparatus 200 or other communication terminal connected to the communication network 300.

The key input part 3 is a device for inputting instructions of the user to the communication terminal. For example, it has number keys, text keys, arrow keys, an execute key, and other keys having various functions. When these keys are operated by the user, the operation content thereof is converted to an electric signal and output to the control part 7.

The audio processing part 4 processes the audio signal input/output at a speaker or microphone. Namely, it applies amplification, analog-to-digital conversion, encoding, or other signal processing to the audio signal input from the microphone, converts this to digital audio data, and outputs the same to the control part 7. Further, it applies decoding, digital-to-analog conversion, amplification, or other signal processing to the audio data supplied from the control part 7, converts this data to an analog audio signal, and outputs the same to the speaker.

The display part 5 is configured by using for example a liquid crystal display panel, organic EL panel, or other display device and displays an image in response to image data supplied from the control part 7. For example, it displays a telephone number as a destination at the time of transmission, a telephone number of the other party in the call at the call reception time, the contents of received mail and transmitted mail, a standby screen, date, time, remaining battery life, and so on.

Further, when performing group communication according to PoC, the display part 5 displays various information sent from the communication management apparatus 200. For example, it displays a table of communication terminals participating in group communication, information of signal reception states of communication terminals, etc.

The storage part 6 stores various types of data utilized in the processing of the control part 7 and the data of processing results of the control part 7. For example, it stores a computer program of the control part 7, constant data used in that processing, variable data which must be temporarily held in the processing step, and so on.

The control part 7 performs various types of processing concerning the overall operation of the communication terminals.

For example, it controls the input/output of audio in the audio processing part 4, input of text data from the key input part 3, display of information on the display part 5, and transmission/reception of data in the communication part 2 so that the speech communication and data communication according to the predetermined protocol in PoC are suitably carried out as the processing relating to group communication.

The control part 7 for example has a computer for executing processing based on a program (operating system, application, etc.) stored in the storage part 6 and executes the processing explained above according to the program.

The control part 7 has, as processing blocks related with group communication of PoC, a transmission control part 71, a reception control part 72, a display control part 73, and a signal reception sensitivity acquisition part 74.

The signal reception sensitivity acquisition part 74 acquires the data of reception sensitivity of a radio signal transmitted from a base station as the information concerning the radio signal reception state. For example, it evaluates the reception sensitivity of the radio signal based on an intensity of the received signal at the communication part 2, a ratio of a received signal wave to an interference signal wave, or the like.

The transmission control part 71 transmits the data from the communication part 2 at group communication of PoC. For example, when a predetermined sending key of the key input part 3 is depressed when performing group communication of PoC, a transmission request is transmitted from the communication part 2 to the communication management apparatus 200.

When this request is permitted in the communication management apparatus 200, the audio data input at the audio processing part 4 is transmitted from the communication part 2 to the other communication terminals.

Further, the transmission control part 71 transmits the data of the reception sensitivity acquired at the signal reception sensitivity acquisition part 74 from the communication part 2 to the communication management apparatus 200.

For example, the transmission control part 71 judges whether or not the signal reception state has changed based on the data of the reception sensitivity acquired at the signal reception sensitivity acquisition part 74. When judging that it has changed, it transmits the data of the reception sensitivity acquired from the communication part 2 to the communication management apparatus 200 after that change. In this case, the transmission control part 71 compares the reception sensitivity data acquired the previous time and the reception sensitivity data acquired the current time and may judge that the signal reception state has changed when both data are different. Alternatively, it compares the acquired reception sensitivity data with the predetermined threshold value and may judge that the signal reception state has changed in a case where the reception sensitivity data has degraded more than a threshold value or a case where it has been enhanced more than a threshold value.

Further, when the transmission request of the reception sensitivity sent from the communication management apparatus 200 is received at the communication part 2, the transmission control part 71 may transmit the data of the reception sensitivity acquired at the signal reception sensitivity acquisition part 74 from the communication part 2 to the communication management apparatus 200.

The reception control part 72 receives the data at the communication part 2 at the time of group communication of PoC. For example, it receives a table of communication terminals participating in group communication, reception sensitivity data of the other communication terminals, and other various types of information provided by the communication management apparatus 200. Further, it receives the transmission request of the reception sensitivity or other request or notification from the communication management apparatus 200.

The display control part 73 controls the display part 5 in connection with the display of information. For example, it displays, on the display part 5, various types of information and notifications received from the communication management apparatus 200 at the time of group communication according to PoC.

Next, an explanation will be given of the configuration of the communication management apparatus 200.

Figure 3:
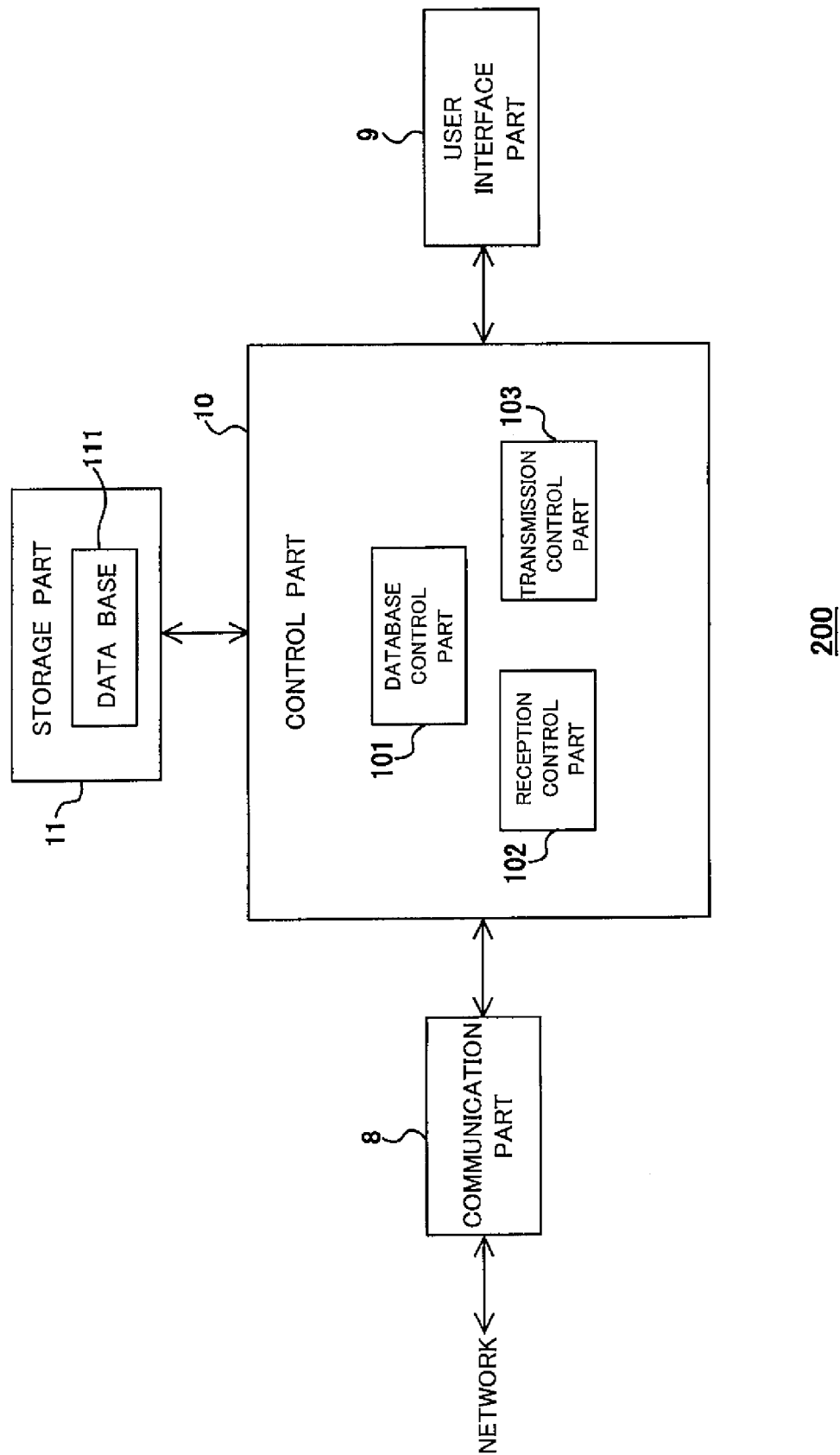
FIG. 3 is a diagram showing an example of the configuration of a communication management apparatus.

FIG. 3 is a diagram showing an example of the configuration of the communication management apparatus 200.

The communication management apparatus 200, for example, as shown in FIG. 3, has a communication part 8, a user interface part 9, a control part 10, and a storage part 11.

The communication part 8 performs the processing concerning communication via the communication network 300. For example, where group communication according to PoC is to be carried out, the communication management apparatus 200 is connected to an IP network. The communication part 8 performs the processing concerning the transmission/reception of data via this IP network.

The user interface part 9 is for example, a keyboard, mouse, display device, etc. for inputting/outputting information for operating the communication management apparatus 200.

The storage part 11 stores various types of data utilized in the processing of the control part 10 and the data as a result of processing of the control part 10. For example, it stores a computer program of the control part 10, constant data used in the processing thereof, variable data which must be temporarily held in the processing step, and so on.

Further, the storage part 11 stores a database 111 for managing various types of information of communication terminals participating in group communication.

FIG. 4 is a diagram showing an example of information registered in the database 111. The database 111, as shown in for example FIG. 4, includes names of members owning terminals, information indicating whether or not each terminal is participating in group communication at present (that is whether or not the terminal is logged in), data of reception sensitivities acquired at communication terminals, telephone numbers allocated to terminals, image data used for displaying graphic representations of members in the display part 5, and other variety of information concerning communication terminals.

The control part 10 performs various processing concerning the overall operation of the communication management apparatus 200. For example, it performs processing for calling up the communication terminals of the other parties and establishing the communication session when the start of group communication is requested from one communication terminal, processing for coordinating transmission requests of communication terminals and permitting transmission from one communication terminal, processing for receiving data of reception sensitivities acquired at communication terminals and registering the same in the database 111, processing for providing the information registered in the database 111 to communication terminals participating in the group communication, and so on.

The control part 10 has for example a computer for executing processing based on a program (operating system, application etc.) stored in the storage part 11 and executes the processing according to the program.

The control part 10 has, as processing blocks relating to group communication of PoC, a database control part 101, a reception control part 102, and a transmission control part 103.

The database control part 101 performs processing relating to the updating of the database 111 held in the storage part 11. For example, when data of the reception sensitivity sent from the communication terminal is received at the communication part 2, the database control part 101 searches for the entry of the corresponding communication terminal from the database 111 using the telephone number etc. of the originating communication terminal as a clue. Then, it rewrites the data of the reception sensitivity related to the found entry of the communication terminal by the newly sent data of reception sensitivity.

The reception control part 102 performs processing for receiving data transmitted from the communication terminals at the communication part 8 in group communication of PoC. For example, it receives a request from the communication terminal desiring to transmit a signal, data of reception sensitivities acquired at communication terminals, etc.

The transmission control part 103 transmits the data from the communication part 8 to communication terminals in group communication of PoC. For example, when the database 111 is updated in the database control part 101, it transmits the updated information (presence/absence of log-in of each communication terminal, reception sensitivity data etc.) from the communication part 8 to each communication terminal. At this time, the transmission control part 103 may transmit the updated information to all communication terminals all together or transmit the updated information to only the part of the communication terminals excluding the updated information provider side communication terminal.

Further, the transmission control part 103 may transmit a request from the communication part 8 to each communication terminal so as to transmit the data of the reception sensitivity acquired at each communication terminal to the communication management apparatus 200.

Here, an explanation will be given of the operation of the communication system according to the present embodiment having the configuration explained above.

First, an explanation will be given of an example of the processing in the communication terminal with reference to FIG. 5.

Figure 5A:
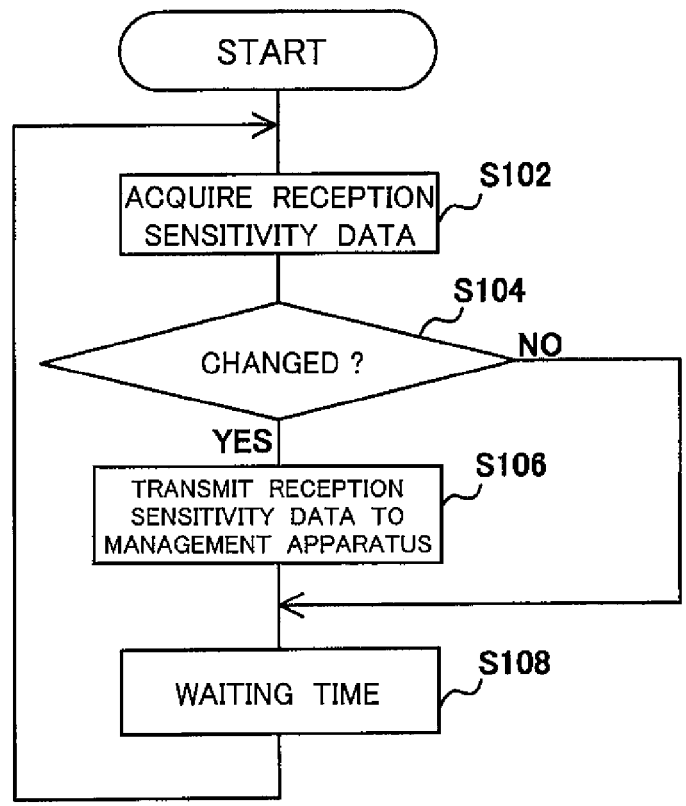
FIG. 5 are diagrams showing a first example of the processing in the communication terminal.
Figure 5B:
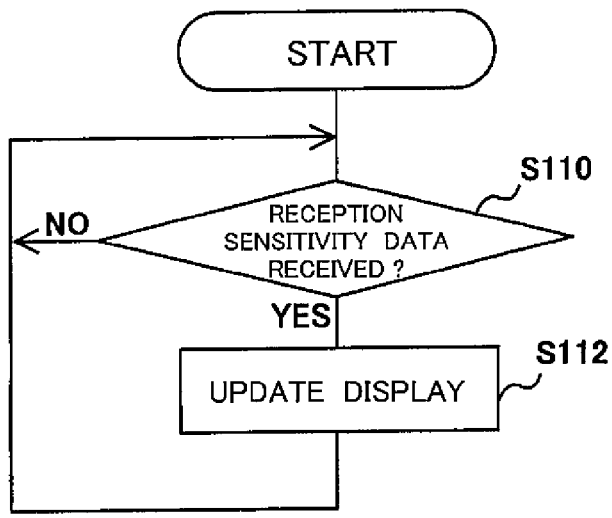

FIG. 5A shows an example of the processing for acquiring the reception sensitivity data in the signal reception sensitivity acquisition part 74, and FIG. 5B shows an example of the processing for displaying the reception sensitivity data of the other communication terminals.

The signal reception sensitivity acquisition part 74 acquires the data of the reception sensitivity and temporarily stores this in the storage part 6 (step S102). Then, the transmission control part 71 compares the reception sensitivity data acquired the previous time which is stored in the storage part 6 and the reception sensitivity data acquired the current time (step S104). When both data are different, the transmission control part 71 judges that the signal reception state of the terminal has changed and transmits the reception sensitivity data acquired the current time and to be stored in the storage part 6 from the communication part 2 to the communication management apparatus 200 (step S106). Then, the communication terminal, after a predetermined waiting time passes (step S108), returns to step S102 again and acquires the reception sensitivity.

On the other hand, the reception control part 72 judges whether or not various types of information sent from the communication management apparatus 200 is received at the communication part 2 and notifies the reception to the control part 73 when the information is received (step S110). When the information from the communication management apparatus 200 is received, the display control part 73 updates the display screen of the display part 5 based on the received information. For example, it updates, from time to time, data which are the list of communication terminals participating in group communication, reception sensitivities of communication terminals, or other information on the display screen based on the new information sent from the communication management apparatus 200.

Next, an explanation will be given of an example of the updating of the signal sensitivity data in the communication management apparatus 200 with reference to FIG. 6.

The reception control part 102 judges whether or not the reception sensitivity data sent from a communication terminal is received at the communication part 8 and, when it is received, notifies this operation to the database control part 101 (step S202). When the reception sensitivity data is received at the communication part 8, the database control part 101 searches for the entry of the appropriate communication terminal from the database 111 using the telephone number etc. of the communication terminal which transmits this reception sensitivity data as a clue (step S204). When the entry of the appropriate communication terminal is found, the database control part 101 rewrites the reception sensitivity data related to the entry of this communication terminal by the newly sent reception sensitivity data (step S208). When the database 111 is updated by the database control part 101, the transmission control part 103 transmits that updated information from the communication part 2 to the communication terminals (step S210). After this operation, the communication management apparatus 200 returns to step S202 again and waits for the received sensitivity data from a communication terminal.

On the other hand, when the entry of the appropriate communication terminal is not found in the search of step S204, the data control part 101 does not update the database 111, but returns to step S202.

Next, an explanation will be given of an example of the overall operation of the communication system for executing the processing in FIG. 5 and FIG. 6 explained above with reference to FIG. 7.

The communication terminal 100-1 executes a predetermined log-in processing in order to newly participate in group communication (step S302). By this log-in processing, when a log-in request is transmitted from the communication terminal 100-1 to the communication management apparatus 200 (step S304), the communication management apparatus 200 permits the participation of the communication terminal 100-1 after receiving this log-in request. Further, the database control part 101 of the communication management apparatus 200 registers "logged in" in an entry indicating whether or not the communication terminal 100-1 is logged in inside the database 111 (step S306).

When the database 111 is updated by the database control part 101, the transmission control part 103 of the communication management apparatus 200 transmits the updated content thereof from the communication part 8 to each communication terminal (step S308). Namely, it transmits information concerning the communication terminal 100-1 newly participating in the group communication to each communication terminal.

The display control part 73 of each communication terminal displays information sent from the communication management apparatus 200, that is, information of the newly participating communication terminal 100-1 and existing communication terminals 100-2 to 100-4 on the screen of the display part 5 (steps S310, S312, S314, S316). For example, it adds the member name of the communication terminal 100-1 in which has newly participated to the list displaying a list of the names of members participating in the group communication.

Here, when the signal reception state of the communication terminal 100-1 changes (step S318), the transmission control part 71 thereof transmits the reception sensitivity data acquired at the radio signal reception sensitivity acquisition part 74 from the communication part 2 to the communication management apparatus 200 (step S320).

When this reception sensitivity data is received at the communication part 2 of the communication management apparatus 200, the database control part 101 updates the reception sensitivity data of the communication terminal 100-1 registered in the database 111 based on the received data (step S322).

Figure 7:
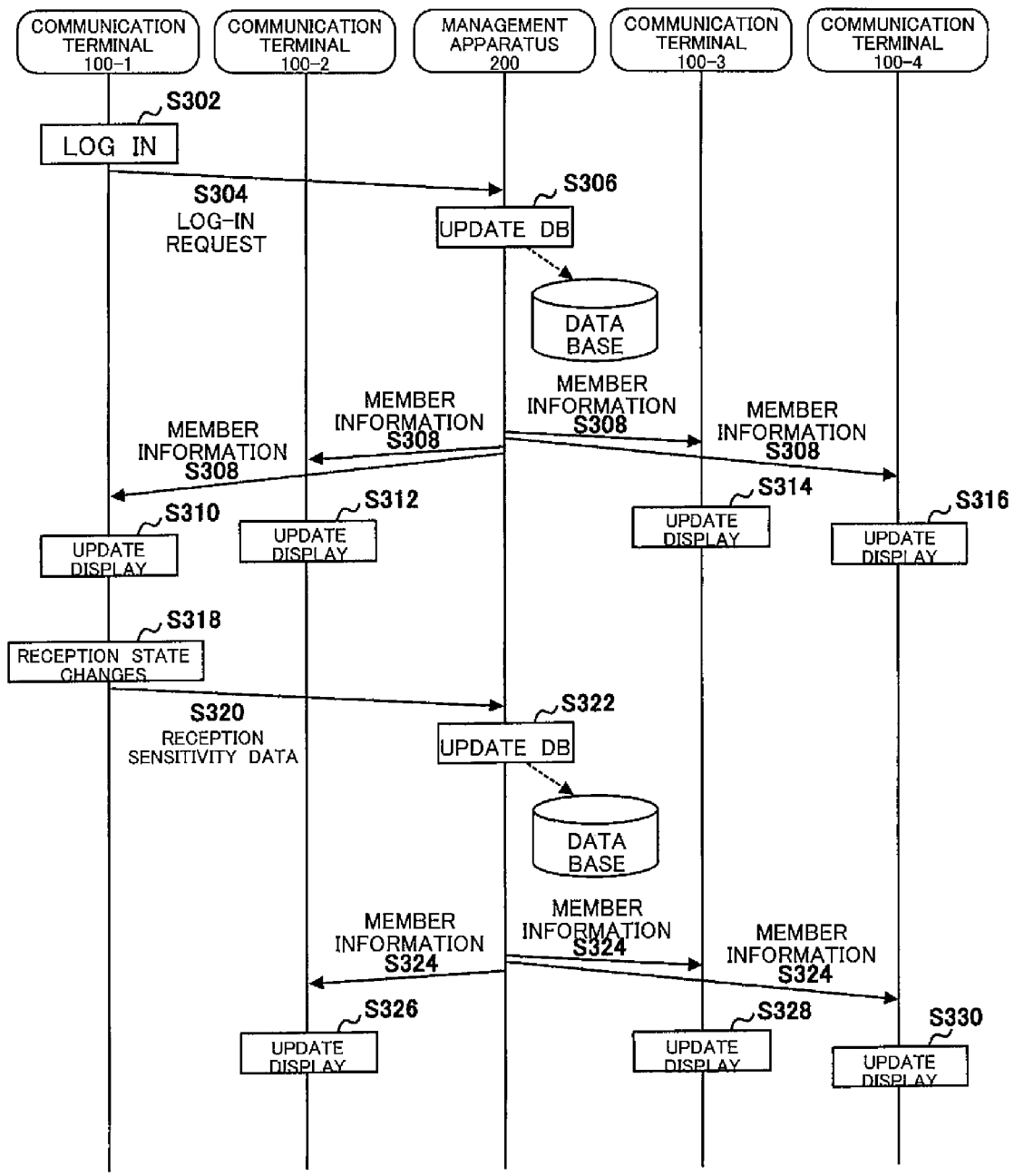
FIG. 7 is a diagram showing a first example of the overall operation of the communication system.

When the database 111 is updated by the database control part 101, the transmission control part 103 of the communication management apparatus 200 transmits the updated content thereof from the communication part 8 to each communication terminal (step S324). Namely, new reception sensitivity data of the communication terminal 100-1 is transmitted to each communication terminal. In the example of FIG. 7, the reception sensitivity data is transmitted to the other communication terminals (100-2, 100-3, 100-4) except the communication terminal 100-1.

The display control part 73 of each communication terminal displays the information sent from the communication management apparatus 200, that is, new reception sensitivity data of the communication terminal 100-1, on the screen of the display part 5 (steps S326, S328, S330). For example, it updates the display relating to the signal reception state of the communication terminal 100-1 based on the newly sent reception sensitivity data.

Next, an explanation will be given of another example of the operation of the communication system according to the present embodiment.

Figure 6:
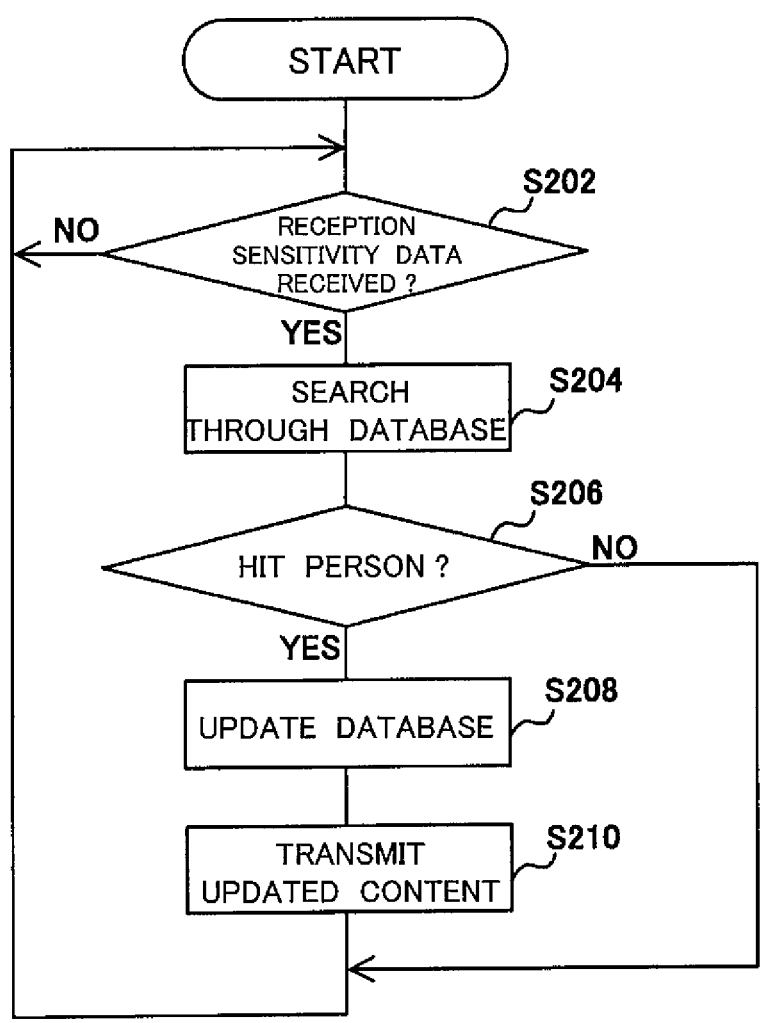
FIG. 6 is a diagram showing a first example of updating of signal sensitivity data in the communication management apparatus.

In the example of operation shown in FIG. 5 to FIG. 7 explained above, the reception sensitivity data is autonomously transmitted from each communication terminal to the communication management apparatus 200. Therefore, for example, when a receiving communication terminal suddenly becomes unable to communicate, the other communication terminals and communication management apparatus 200 cannot determined this operational state. Therefore, in the example of operation explained next, the transmission of reception sensitivity data is periodically requested from the communication management apparatus 200 to each communication terminal, and a communication terminal which does not respond to this is judged as incapable of communication.

FIG. 8 are diagrams showing another example of the processing in a communication terminal.

Figure 8A:
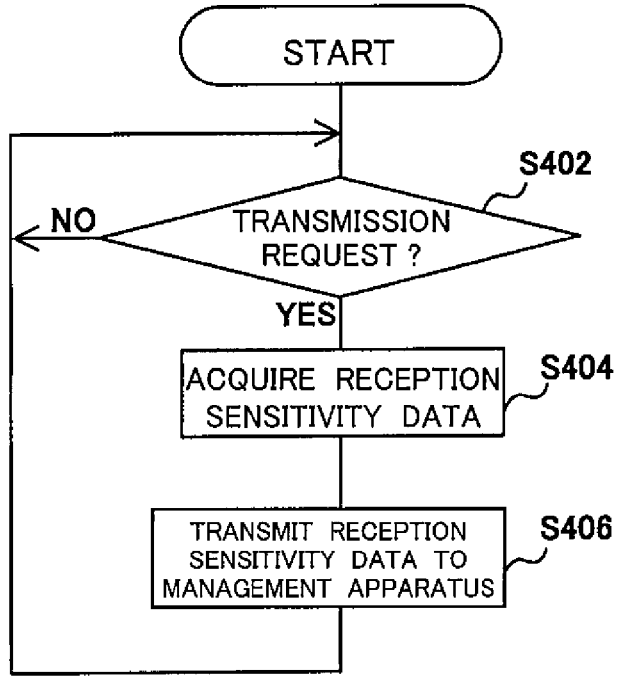
FIG. 8 are diagrams showing a second example of the processing in the communication terminal.
Figure 8B:
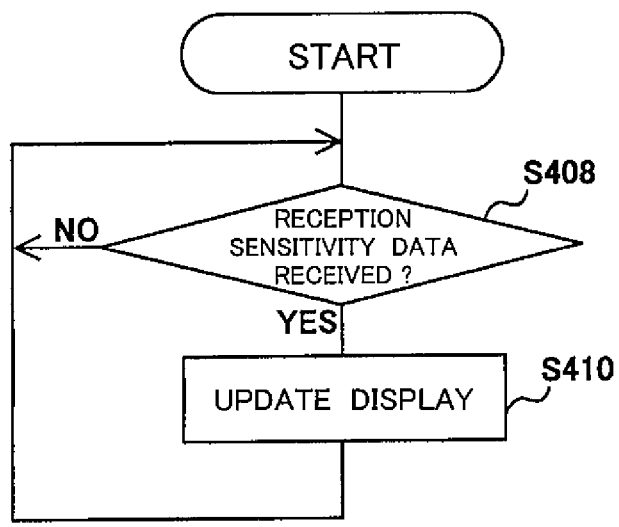

FIG. 8A shows an example of the processing for acquiring the reception sensitivity data in the signal reception sensitivity acquisition part 74, and FIG. 8B shows an example of the processing for displaying the reception sensitivity data of other communication terminals.

The reception control part 72 judges whether or not the transmission request of the reception sensitivity data is received at the communication part 2 and, when it is received, notifies this result to the signal reception sensitivity acquisition part 74 (step S402). When the related transmission request is received at the communication part 2, the radio signal reception sensitivity acquisition part 74 acquires the reception sensitivity data (step S404). Then, the transmission control part 71 transmits the acquired reception sensitivity data from the communication part 2 to the communication management apparatus 200 (step S406). After that, the communication terminal returns to step S402 again and waits for a transmission request of the reception sensitivity data.

The processing shown in FIG. 8B is the same as the previously explained processing shown in FIG. 5B. Namely, the display control part 73 of the communication terminal updates the display of the display part 5 based on the received information whenever the information from the communication management apparatus 200 (for example reception sensitivity data of the other communication terminal) is received.

Figure 9:
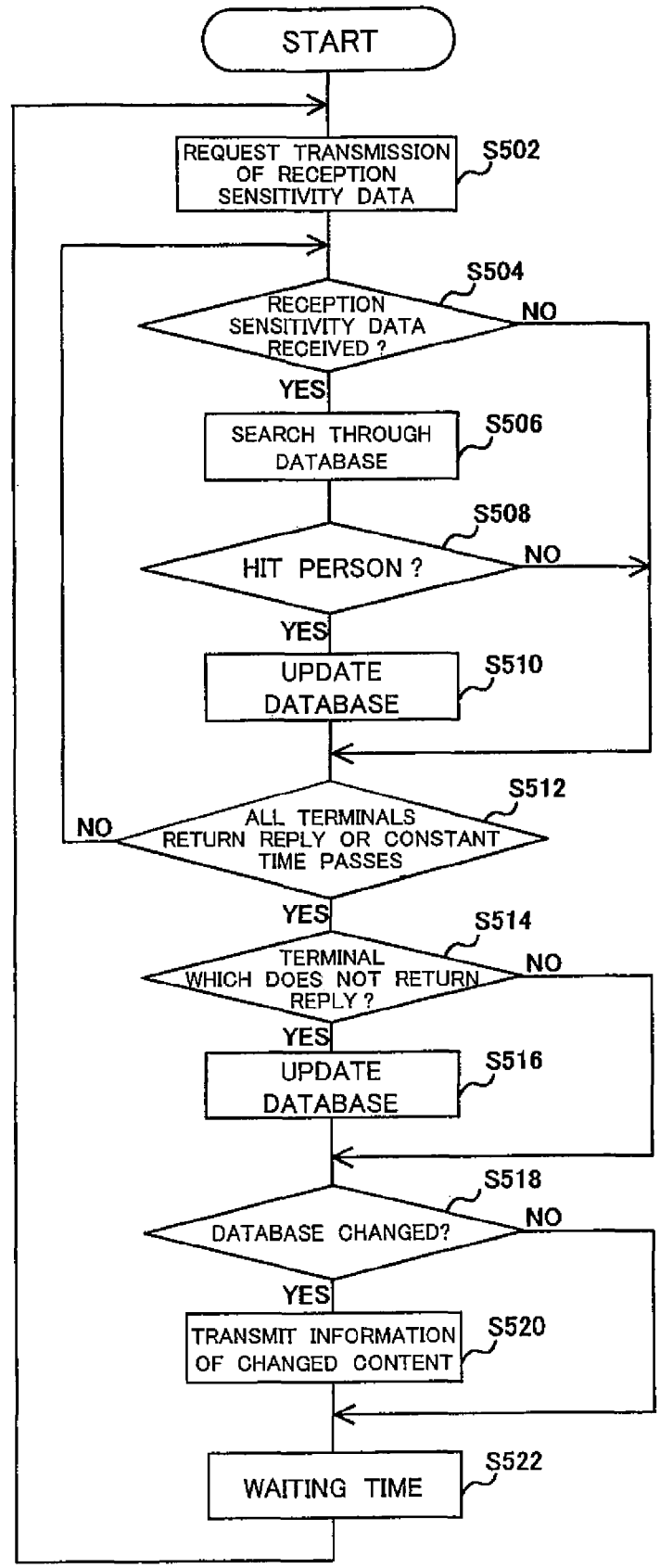
FIG. 9 is a diagram showing a second example of the updating of signal sensitivity data in the communication management apparatus.

FIG. 9 is a diagram showing another example of the updating of the reception sensitivity data in the communication management apparatus 200.

The transmission control part 103 of the communication management apparatus 200 transmits the transmission request of the reception sensitivity data from the communication part 2 to each communication terminal (step S502). The reception control part 102 judges whether or not the reception sensitivity data from the communication terminal is received at the communication part 8 and, when it is received, notifies this result to the database control part 101 (step S504). When the reception sensitivity data is received at the control part 8, the database control part 101 searches for the entry of the appropriate communication terminal from the database 111 using the telephone number etc. of the communication terminal transmitted the reception sensitivity data as a clue (step S506). When the entry of the appropriate communication terminal is found, the database control part 101 rewrites the reception sensitivity data relating to the entry of this communication terminal by the newly sent reception sensitivity data (step S510), then the routine proceeds to step S512. Note that, at this time, the database control part 101 compares the sent reception sensitivity data with the already registered reception sensitivity data and, when both data coincide, does not rewrite. Further, when rewriting, the database control part 101 records for example predetermined information indicating that in the storage part 11.

When the entry of the appropriate communication terminal is not found at step S506, the database control part 101 skips the processing of step S510 explained above and proceeds to step S512 explained later.

At step S512, the database control part 101 judges if the reception sensitivity data was sent from all terminals participating in the group communication or if a predetermined time has passed since the transmission of the reception sensitivity data was requested to each communication terminal (that is, from step S502). In a case where there is a terminal which has not yet returned the reception sensitivity data or a case where the predetermined time has not passed from step S502, the database control part 101 returns to step S504 again and waits for reply from the communication terminal.

When it is judged at step S512 that a constant time has passed, the database control part 101 judges whether or not there is a terminal which has not returned the reception sensitivity data (step S514). When there is a terminal which has not returned it, the database control part 101 registers the fact that the terminal has become incapable of communication at present in the database 111 (step S516) and proceeds to the next step S518. At this time, the database control part 101 records in the storage part 11, for example, predetermined information indicating that the above registration is carried out in the database 111.

On the other hand, when it is judged at step S514 that all terminals have returned replies, the database control part 101 skips the processing of step S516 and proceeds to step S518.

At step S518, the transmission control part 103 judges whether or not the registered content of the database 111 has changed (step S518). For example, it judges any change of the database 111 based on the predetermined information recorded in the storage part 11 at step S510 or S516. When the database 111 has changed, the transmission control part 103 transmits the information of the content of change (for example, the information of the reception sensitivity of the communication terminal which was changed and information of the communication terminal which has become incapable of communication) to each communication terminal (step S520).

When steps S514 to S520 are executed, the communication management apparatus 200 returns to step S502 again after a constant waiting time passes (step S522) and requests transmission of the reception sensitivity data.

Next, an explanation will be given of an example of the overall operation of the communication system for executing the processing in FIG. 8 and FIG. 9 explained above with reference to FIG. 10.

The transmission control part 103 of the communication management apparatus 200 transmits a transmission request of the reception sensitivity data from the communication part 8 to each communication terminal (step S602). In each communication terminal receiving this request, the radio signal reception sensitivity acquisition part 74 acquires the reception sensitivity data (steps S604, S606, S608, S610). Then, the transmission control part 71 of each communication terminal returns the acquired reception sensitivity data from the communication part 2 to the communication management apparatus 200 (steps S612, S614, S616, S618).

When the reception sensitivity data is returned from each communication terminal, the database control part 101 of the communication management apparatus 200 updates the database 111 based on the returned reception sensitivity data (step S620). Further, in the example of FIG. 10, there is no reply returned from the communication terminal 100-1, so the database control part 101 registers that the communication terminal 100-1 has become incapable of communication in the database 111.

Figure 10:
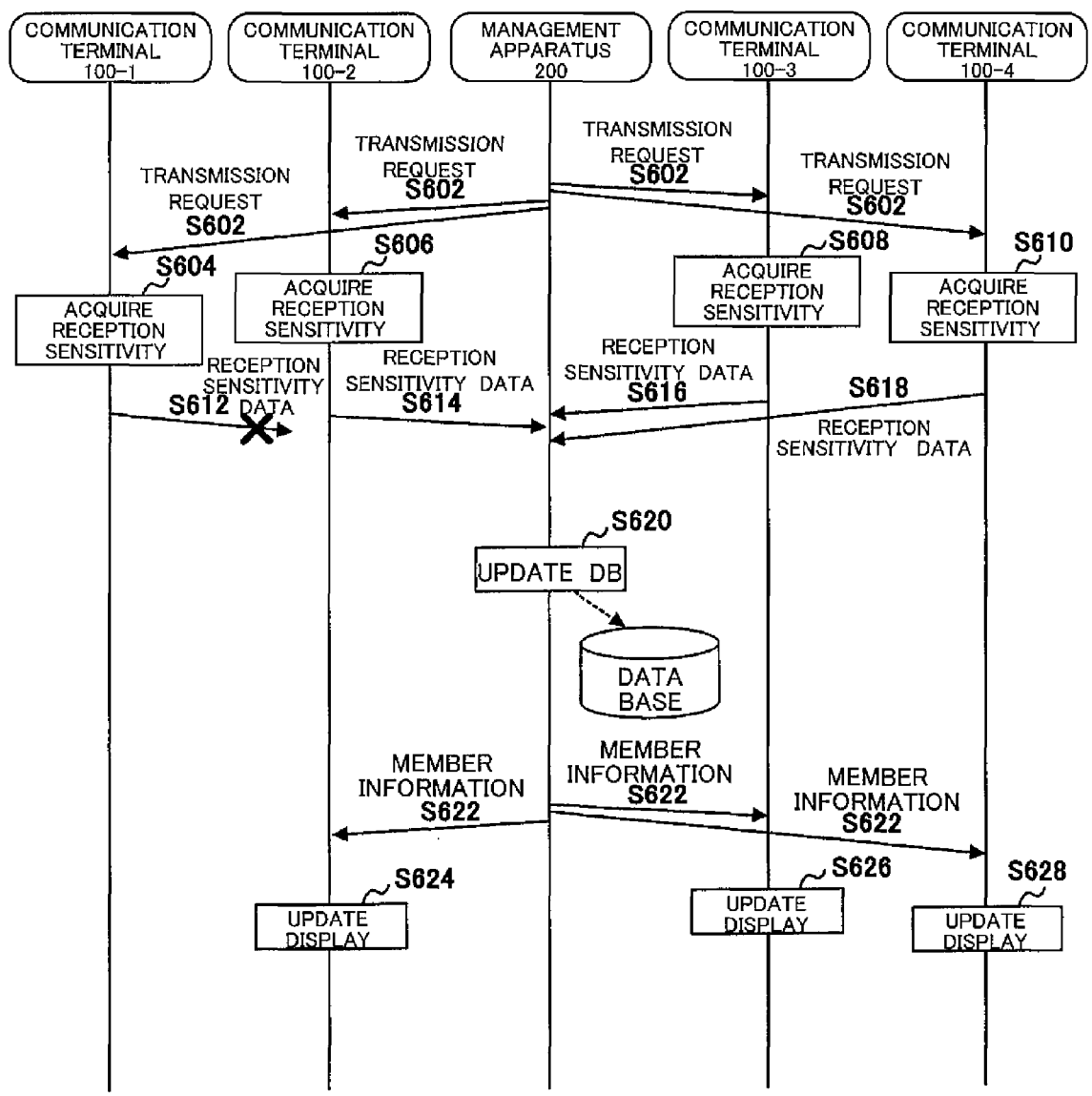
FIG. 10 is a diagram showing a second example of the overall operation of the communication system.

When the content of the database 111 has changed, the transmission control part 103 of the communication management apparatus 200 transmits the information of the content of change (member information) to each communication terminal (step S622). In the example of FIG. 10, the communication terminal 100-1 has become incapable of communication, so the information is transmitted to other communication terminals (100-2 to 100-4) except the communication terminal 100-1.

The display control part 73 of each communication terminal (100-2 to 100-4) receiving the information from the communication management apparatus 200 updates the screen display of the display part 5 based on the received information (steps S624, S626, S628). Namely, the display part 5 of each communication terminal displays that the communication terminal 100-1 has become incapable of communication at present, that the reception sensitivity data was changed at the other communication terminal, and so on.

Next, an explanation will be given of an example of the screen displayed at the display part 5 of a communication terminal with reference to FIG. 11.

Figure 11:
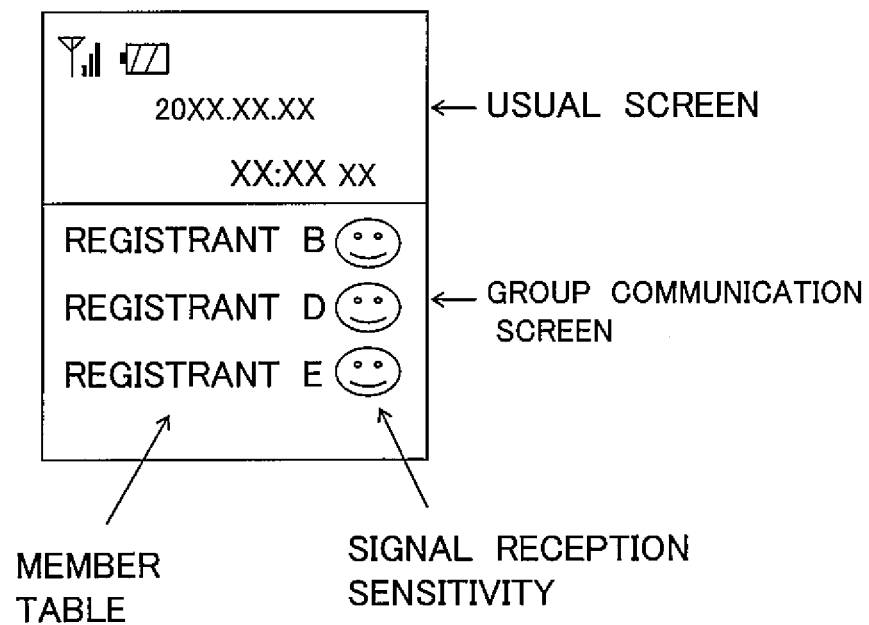
FIG. 11 is a diagram showing an example of a screen displayed at a display part of the communication terminal.

The screen of the display part 5 is, for example as shown in FIG. 11, divided into a usual screen (upper side in the figure) used for standby etc. and a screen for displaying information concerning group communication of PoC (lower side in the figure).

On the usual screen, for example a graphic of an antenna representing the reception sensitivity acquired at the signal reception sensitivity acquisition part 74, a graphic indicating the remaining battery life, and the date, time, and other information relating to the time are displayed.

Figure 12:
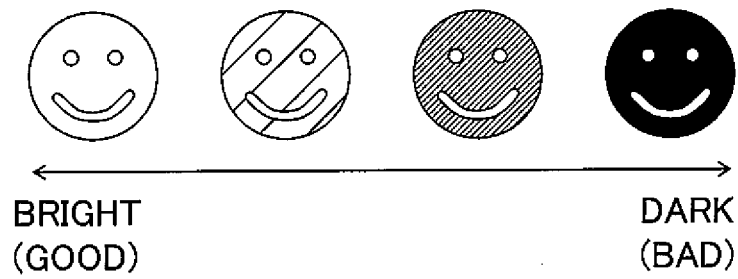
FIG. 12 is a diagram showing an example of marks representing signal reception sensitivities.

On the other hand, on the screen for group communication, for example a list of member names of communication terminals participating in the group communication at present is displayed. A mark representing the reception sensitivity data acquired at each communication terminal is displayed beside that member name. This mark, as shown in for example FIG. 12, represents the reception sensitivity in four stages in response to the brightness of the display and shows that the reception sensitivity is better with increasing the brightness.

As explained above, according to the present embodiment, the information concerning the signal reception state (for example the reception sensitivity of a signal from the base station) is acquired at each communication terminal and transmitted via the communication management apparatus 200 to the other communication terminals. Then, the display part 5 provided in each communication terminal displays information of the signal reception states in the other communication terminals.

Utilizing these results, each communication terminal can correctly grasp the signal reception states of the other communication terminals, therefore it becomes possible to judge whether or not the other communication terminals are always in the normal conversation state, and, in the one to multi communications, occurrence of difference in recognition among users can be suppressed.

Further, according to the present embodiment, a request is periodically transmitted from the communication management apparatus 200 to each communication terminal so as to transmit the information of the signal reception state, then the information of the signal reception state is acquired at each communication terminal receiving this request and returned to the communication management apparatus 200. The information of any communication terminal which does not respond to the transmission request of the communication management apparatus 200 is transmitted from the communication management apparatus 200 to each communication terminal and displayed in the display part 5 of each communication terminal.

Utilizing these results, it can be accurately judged whether or not the communication terminal has become incapable of communication according to presence/absence of a response with respect to the above transmission request of the communication management apparatus 200. Therefore, it becomes possible to further effectively reduce differences in recognition among users and realize smooth communication.

Further, according to the present embodiment, the screen of the display part 5 is divided into the usual screen used for standby etc. and the screen for displaying the information concerning group communication. Therefore, there is no trouble in operation as in a case where two screens are switched between for display. Further, the situation of the group communication can be simultaneously confirmed as well while confirming the usual screen, therefore the convenience is improved.

The explanation was given above of one embodiment of the present invention, but the present invention is not limited to only the above embodiment and includes a variety of variations.

In the above embodiment, the information of the signal reception state transmitted from each communication terminal to the communication management apparatus 200 was registered in the database 111 of the communication management apparatus 200, but the present invention is not limited to this.

For example, it is possible that the information of the signal reception state transmitted from the communication terminal not be held in the communication management apparatus 200, but be transferred as it is from the communication management apparatus 200 to the other communication terminals. In this case as well, in the same way as the above embodiment, the signal reception states of the other communication terminals can be grasped at each communication terminal.

In the example shown in FIG. 11, a mark representing the information of the signal reception state is given beside the name of the member on the screen display using each communication terminal, but the present invention is not limited to this. For example, the member of each communication terminal may be represented by a mark using a symbol, graphic, picture, photo, etc. and the signal reception state may be represented by the color, size, shape, etc. of that mark. By this operation, a communication terminal and the signal reception state can be simultaneously represented by the same mark, therefore the display region of the screen can be saved.

Further, the above embodiment shows the example of displaying the information of signal reception states of other communication terminals in each communication terminal, but the present invention is not limited to this. In general, in PoC and other group communications, provision is made of a communication channel able to transfer data having a relatively small capacity between each communication terminal and the communication management apparatus 200 even during a period where the one to multi communications are carried out. Therefore, various types of information may be transmitted from one receiving communication terminal to the other communication terminals by utilizing this communication channel.

For example, control is performed so that the information to be provided to the other communication terminals is input at the key input part 3 and so that the transmission control part 71 controls the communication part 2 to transmit this information. The communication management apparatus 200 receiving the related information transmitted from the communication terminal transmits this to the other communication terminals. Then, the display control part 73 of the communication terminal receiving the information transmitted via the communication management apparatus 200 controls the display part 5 for displaying the received information.

Due to this operation, for example information relating to the state of apparatus such as the remaining battery life, approval or non-approval, praise, and comments with respect to statements, and other information relating to the display of intent of the user can be transmitted from one communication terminal to the other communication terminals. For this reason, the convenience of one to multi group communications can be further improved.

In the above embodiment, the example of applying the present invention to group communication according to PoC is explained, but the present invention is not limited to this, but can be applied to other various types of group communications for performing one to multi data communication as well.

The processing of the control part 7 of the communication terminal and processing of the control part 10 of the communication management apparatus 200 can be all executed by a computer based on the program or at least a part thereof may be executed by hardware.

The communication terminal of the present invention is not limited to a mobile phone. For example, the present invention can be widely applied to terminal equipment having communication functions for example PDAs (personal digital assistants) and portable game machines.

INDUSTRIAL APPLICABILITY

As described above, in the communication method, communication system, and communication terminal according to the present invention, each terminal can grasp in real time in what state the other receiving terminals are in. Therefore, the present invention can be applied to a one to multi communication method and communication system thereof for mobile phones, PDAs, portable game machines, etc. and a communication terminal for performing one to multi communication.

The invention claimed is:

1. A communication method of communication terminals used in a communication system performing group communication, said communication method characterized by having
   a first step of transmitting, at one of the communication terminals engaged in group communication, first information concerning its own radio signal state, to each of the other communication terminals participating in the group communication,
   a second step of receiving, at one of the communication terminals engaged in group communication, first information indicating a radio signal state acquired at each of the other communication terminals participating in the group communication, and
   a third step of displaying, at one of the communication terminals engaged in group communication, both the received first information and the transmitted first information.

2. A communication system comprising a management apparatus and a plurality of communication terminals coupled in group wireless communication wherein one among the plurality of communication terminals transmits data to the other of the plurality of communication terminals, said communication system characterized in that
   the management apparatus starts the group communication by establishing a communication session with the plurality of communication terminals,
      receives first information indicating a radio signal state from a communication terminal participating in the group communication, and
      transmits the received first information to each of the other communication terminals participating in the group communication, wherein each said communication terminal participating in the group communication transmits first information concerning its own radio signal state to the management apparatus, receives first information indicating a radio signal state acquired at each of the other communication terminals participating in the group communication from the management apparatus, and displays both the received first information and the transmitted first information.

3. A communication terminal used in a communication system performing group communication, said communication terminal characterized by transmitting first information concerning its own radio signal state to other communication terminals participating in the group communication, receiving first information indicating a radio signal state acquired at the other communication terminals participating in the group communication, and displaying both the first information concerning its own state and the received first information.

4. A communication terminal as set forth in claim 3, wherein the first information includes information of a radio signal reception state.

5. A communication terminal as set forth in claim 3, wherein the communication terminal transmits changed first information to the other communication terminals when the first information changes.

6. A communication terminal as set forth in claim 4, wherein:

the communication terminal displays a list in which a mark representing the radio signal reception state is given to the communication terminal and the other communication terminals based on said first information.

7. A communication terminal as set forth in claim 6, wherein:

the communication terminal changes at least one of a color, size, and shape of said mark in response to the radio signal reception state of each terminal and displays the changed mark.

8. A communication terminal as set forth in claim 4, wherein:

the communication terminal displays a list in which the radio signal reception states of the communication terminal and the other communication terminals are represented by an identifiable mark based on said first information.

9. A communication terminal as set forth in claim 8, wherein:

the communication terminal changes at least one of a color, size, and shape of said mark in response to the radio signal reception state of each terminal and displays the changed mark.

10. A communication terminal as set forth in claim 6, wherein the mark given to each terminal has a same shape.

11. A communication terminal as set forth in claim 6, wherein the communication terminal displays a graphic representing the radio signal reception state acquired by the communication terminal and a list given the mark.

12. A communication terminal used in a communication system comprising three or more communication terminals coupled in wireless communication and a management apparatus and performing group communication wherein one among the three or more communication terminals transmits data to the other communication terminals, the communication terminal comprising:

a communication part for transmitting a start request for requesting a start of the group communication to the management apparatus and for establishing a communication session with the other communication terminals, a display part for displaying information, an information acquisition part for acquiring first information concerning its own radio signal state from the communication part in a situation with the communication session established, a transmission control part for controlling the communication part so as to transmit the acquired first information to the other communication terminals participating in the group communication, a reception control part for controlling the communication part so as to receive first information indicating a radio signal state acquired by the other communication terminals participating in the group communication in the situation with the communication session established, and a display control part for displaying, in the display part, both the first information of the communication terminal and the received first information of the other communication terminals participating in the group communication.

13. A communication terminal as set forth in claim 12, wherein the display control part displays, in the display part, a list in which a mark representing a radio signal reception state is given to the communication terminal and the other communication terminals based on the received first information.

14. A communication terminal as set forth in claim 13, wherein the mark given to each communication terminal has a same shape.

15. A communication terminal as set forth in claim 12, wherein the display control part displays, in the display part, a graphic representing the radio signal state acquired by the information acquisition part from the communication part and a list given the mark.

* * * * *